United States Patent
Tam et al.

(10) Patent No.: US 7,266,260 B2
(45) Date of Patent: Sep. 4, 2007

(54) FBG SENSOR INTERROGATION METHOD USING SEMICONDUCTOR OPTICAL AMPLIFIER IN RING CAVITY CONFIGURATION

(75) Inventors: Hwa Yaw Tam, Hong Kong (CN); Weng Hong Chung, Hong Kong (CN)

(73) Assignee: The Hong Kong Polytechnic University, Kowloon (HK)

( * ) Notice: Subject to any disclaimer, the term of this patent is extended or adjusted under 35 U.S.C. 154(b) by 9 days.

(21) Appl. No.: 11/325,983

(22) Filed: Jan. 5, 2006

(65) Prior Publication Data
US 2007/0154130 A1 Jul. 5, 2007

(51) Int. Cl.
G02B 6/00 (2006.01)
G02B 6/34 (2006.01)
G01N 21/00 (2006.01)

(52) U.S. Cl. ............... 385/12; 385/37; 356/73.1

(58) Field of Classification Search ............ None
See application file for complete search history.

(56) References Cited

U.S. PATENT DOCUMENTS 5,838,437 A * 11/1998 Miller et al. ............. 356/478
6,122,305 A * 9/2000 Putnam et al. ............ 372/94
6,449,047 B1 * 9/2002 Bao et al. ................. 356/478
6,571,027 B2 * 5/2003 Cooper et al. ............ 385/12
7,046,349 B2 * 5/2006 Everall et al. .......... 356/73.1
2002/0025097 A1 * 2/2002 Cooper et al. ............ 385/12

* cited by examiner

Primary Examiner—Rodney Bovernick
Assistant Examiner—Omar Rojas
(74) Attorney, Agent, or Firm—Knobbe, Martens, Olson & Bear LLP (57) ABSTRACT

A sensor device that uses a number of bragg grating (FBG) sensors and novel interrogation system with a ring cavity configuration for simultaneous time-division-multiplexex (TDM) and wavelength-division-multiplexed (WDM) interrogation of FBG sensors. The ring cavity includes an amplifier, and output coupler and an optical circulator. The coupler is connected to a wavelength measuring system and the optical circulator is connected to the FBG sensors. The FBG sensors can be in a number of groups. TDM interrogation is applied to each group of FBG sensors while WDM interrogation is applied to each FBG sensors within each group.

7 Claims, 10 Drawing Sheets

$$f_i = \frac{c}{n(L_{ring} + 2L_i)}$$

$$\frac{2nL_D}{c} > \tau \geq \frac{2nL_G}{c}$$

FIG. 10

FBG SENSOR INTERROGATION METHOD USING SEMICONDUCTOR OPTICAL AMPLIFIER IN RING CAVITY CONFIGURATION

FIELD OF THE INVENTION

The invention relates to time- and wavelength-division multiplexing interrogation system of fiber Bragg grating sensors. More particularly, it relates to an optical interrogation system based on an optical amplifier in ring cavity configuration.

BACKGROUND OF THE INVENTION

Fiber Bragg grating (FBG) has been accepted as an important sensor technology because of its self-referencing capability, large-scale multiplexing capability and immunity to electromagnetic interference. Wavelength-division multiplexing (WDM) technique [1] can be easily employed to multiplex and interrogate FBG sensor array, and thus it is commonly used in FBG sensor applications. The number of FBG sensors that can be accommodated in a WDM-FBG sensor array is determined by the usable spectral bandwidth of the system and the wavelength-shift of each FBG sensor. On the other hand, time-division-multiplexing (TDM) technique identifies the sensing signal by gating the pulses reflected from FBGs, therefore, FBGs having identical resonant wavelengths can be deployed along the same fiber. Hence, TDM-FBG technique relieves the spectral bandwidth issue and permits the interrogation of up to 100 FBGs along a fiber. However, the reflectivity of the FBGs employed in TDM sensor systems are generally less than 5% and thus the reflected signal power is fairly weak in comparison with WDM-FBG systems.

Various TDM systems have been reported during the last decade [2-7]. The main challenge of a TDM system is to measure the sensing signal accurately because of the weak signal power reflected from low reflectivity sensors. Amplified spontaneous emission (ASE) generated by an erbium-doped fiber amplifier [3] and passively mode-locked fiber laser operating in square-pulse regime [4] have been employed as sources to illuminate low reflectivity FBGs array with the objective to increase the signal power reflected from the FBGs. Another approach utilized active mode-locking technique [5] to selectively address individual FBG in a two-FBG array that act as reflectors of a linear cavity erbium-doped fiber laser. This active laser approach produces intense output power at the resonant wavelength of the selected FBG sensor. Recently, Lloyd et al. [6-7] reported a resonant TDM configuration that uses a SOA, a broadband reflector and an array of 10 FBGs to construct a linear resonant cavity sensor system, high power and high extinction ratio output signal were demonstrated by properly gating the SOA. While those prior practices are workable to various degrees, the need still exists for a simpler FBG sensor system with better performance and less construction expense.

REFERENCE

[1] A. D. Kersey, M. A. Davis, H. J. Patrick, M. LeBlanc, K. P. Koo, C. G. Askins, M. A. Putnam, and E. J. Friebele, "Fiber grating sensors," *J. Lightw. Tecnhol.*, vol. 15, pp. 1442-1463, August 1997.

[2] D. J. F. Cooper, T. Coroy, and P. W. E. Smith, "Time-division multiplexing of large serial fiber-optic Bragg grating sensor arrays," *Appl. Opt.*, vol. 40, pp. 2643-2654, 2001.

[3] T. A. Berkoff, M. A. Davis, D. G. Bellemore, A. D. Kersey, G. M. Williams, and M. A. Putnam, "Hybrid time and wavelength division multiplexed fiber Bragg grating sensor array," in *Proc. SPIE Smart Sensing, Processing and Instrumentation*, vol. 2444, pp. 288-294, 1995.

[4] M. A. Putnam, M. L. Dennis, 1. N. Duling III, C. G. Askins, and E. J. Friebele, "Broadband square-pulse operation of a passively mode-locked fiber laser for fiber Bragg grating interrogation," *Opt. Lett.*, vol. 23, pp. 138-140, 1998.

[5] A. D. Kersey and W. W. Morey, "Multiplexed Bragg grating fibre-laser strain-sensor system with mode-locked interrogation," *IEE Electron. Lett.*, vol. 29, pp. 112-114, January 1993.

[6] G. D. Lloyd, I. Bennion, L. A. Everall, and K. Sugden, "Novel resonant cavity TDM demodulation scheme for FBG sensing," in *Proc. CLEO'* 04, paper CWD4, May 2004.

[7] G. D. Lloyd, L. A. Everall, K. Sugden, and I. Bennion, "Resonant cavity time-division-multiplexed fiber Bragg grating sensor interrogator," *IEEE Photon. Technol. Lett.*, vol. 16, pp. 2323-2325, October 2004.

SUMMARY OF THE INVENTION

One object of the present invention is therefore to provide a simpler FBG sensor interrogation system with high performance. To achieve the object, an embodiment of the present invention utilizes a ring cavity configuration as exemplified in FIG. 1. The ring cavity configuration, compared with the liner cavity configuration, offers the advantages of fewer component counts (lower cost), lower insertion loss (better performance), and simpler driving pattern (less complexity).

According to one aspect of the invention, there is provided a sensor system, comprising a plurality of FBG sensors; a ring cavity comprising a gain modulated device having an input end and an output end and an optical coupler; and a wavelength measuring system. The gain modulated device may be driven by a pulse generator.

Figure 6:
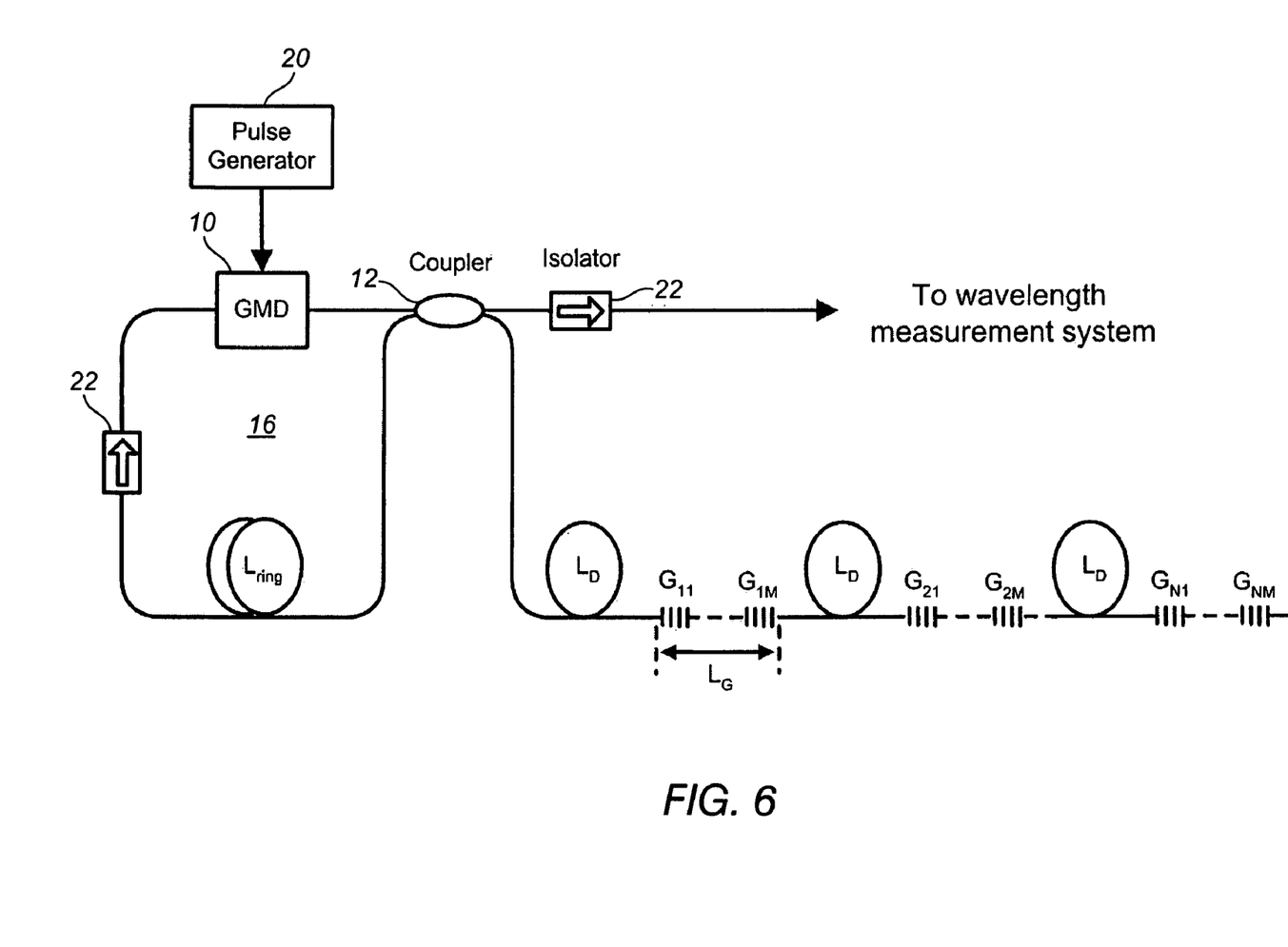
FIG. 6 shows another sensor system configuration according to another embodiment of the present invention.

According to another aspect of the invention, in a sensor system shown in FIG. 6, the above mentioned optical coupler has at least four optical leads connected to the input end of the gain modulated device, the output end of the gain modulated device, the wavelength measuring system and the FBG sensors, respectively. In this system, the optical coupler is used both for outputting signal to the sensors and the wavelength measuring system and for feeding the reflected signal from the sensors into the ring cavity.

According to another aspect of the invention, a sensor system further comprises an optical circulator with at least three ports that connect to the optical coupler, the input end of the gain modulated device and the FBG sensors, respectively. In this sensor system the optical coupler is not used for feeding the reflected signal from the sensors to the ring cavity and thus may need only three optical leads, connected to the output end of the gain modulated device, the wavelength measuring system and said FBG sensors, respectively.

According to another aspect of the invention, a sensor system further comprises an isolator between the optical coupler and the wavelength measuring system and a second isolator between the optical circulator or coupler (if there is no circulator) and the input end of the gain modulated device (GMD). In the circulator-less configuration (see FIG. 6), the coupler feeds the signal to the wavelength measuring system and to the sensor array, while the signal reflected from the sensors also feedback to the cavity (the output end of the GMD and input end of isolator) through this coupler, the isolator ensures that light in the cavity propagates in clockwise direction (unidirectional) inside the ring cavity.

According to another aspect of the invention, the gain modulated device in a sensor system may be a semiconductor amplifier or linear optical amplifier. The gain modulated device may have two coupled components: an Erbium doped fiber amplifier and an electro-optical modulator.

According to another aspect of the invention, a sensor system may have two or more gain modulated devices to increase the usable wavelength bandwidth.

According to another aspect of the invention, a sensor system may contain a number of FBG sensors which are divided into a number of units. Sensors within a given unit may have different resonant wavelengths and are suitable for wavelength-division-multiplexing interrogation. On the other hand, sensors from different units should have substantially identical resonant wavelengths as their interrogation is of time-division-multiplexing.

According to another aspect of the invention, there is provided a method for interrogating a number of sensor units each containing one or more FBG sensors. The method comprises:
(a) switching on and off a gain modulated device (GMD) at a repetition rate predetermined for interrogating one of the sensor units. The GMD has separate input and output ends for receiving input and sending output;
(b) splitting the output from the GMD into at least two portions;
(c) sending one of the portions to a wavelength measuring system;
(d) sending another portion to the sensor units each of which generate a reflection;
(e) feeding the reflection by the sensor units as input to the input end of the GMD which is configured to be switched on when the reflection from one sensor unit arrives while being switched off when the reflection from any other sensors arrives;
(f) repeating steps (b)-(e) for a number of times, which may be performed not in the order from (a) to (e) and some of the steps may be performed simultaneously, until the reflection from the particular sensor is sufficiently amplified for measurement;
(g) changing the repetition rate of step (a) to a predetermined rate suitable for interrogating another sensor unit and repeating steps (b)-(e); and
(h) repeating step (g) a number of times so that all the sensor units are interrogated.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described certain embodiments of the invention.

DETAILED DESCRIPTION OF THE PREFERRED EMBODIMENT

Figure 1:
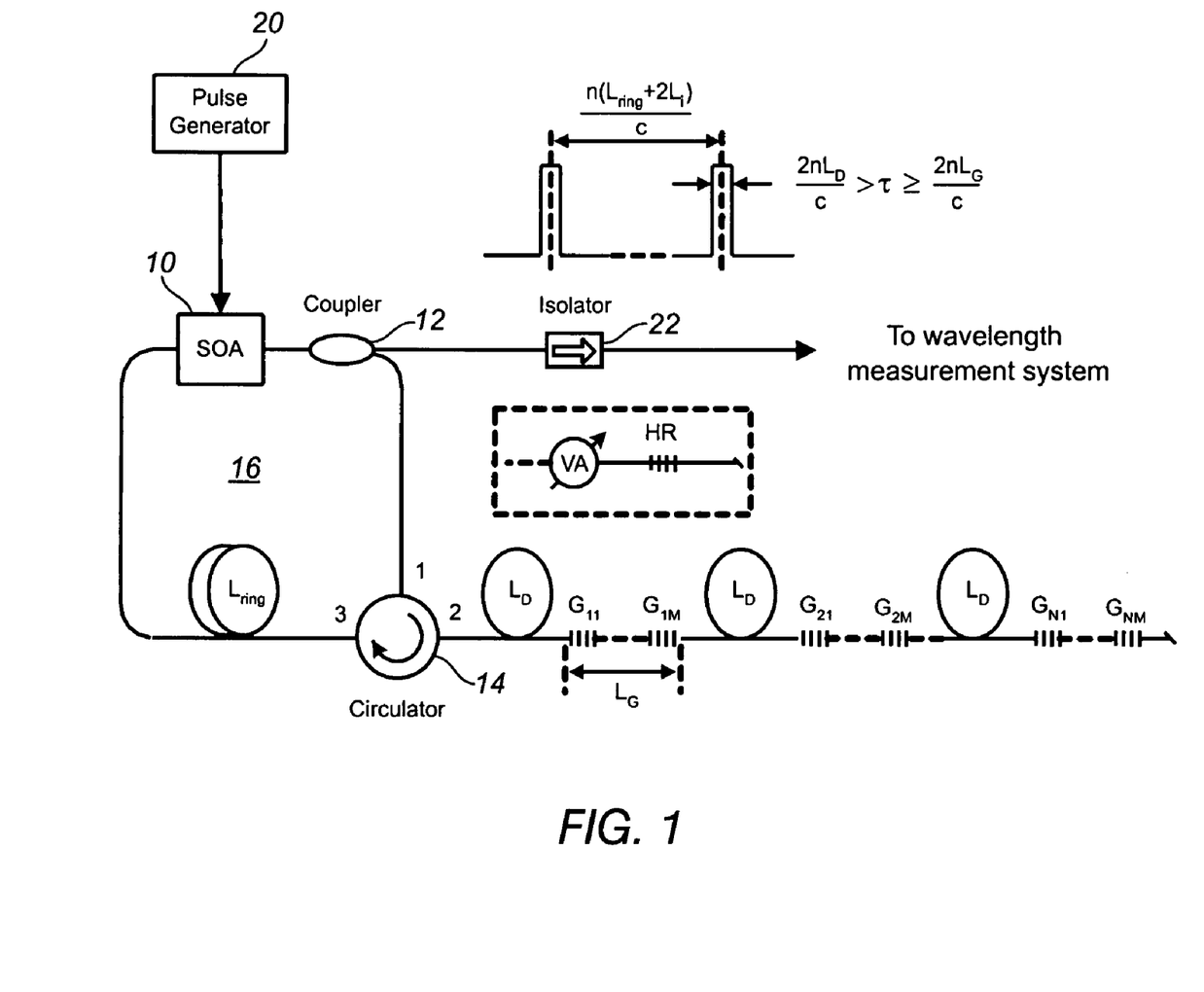
FIG. 1 shows a sensor system configuration according to an embodiment of the present invention.

System Configuration and Operation Principles:

FIG. 1 shows a configuration of a TDM+WDM FBG sensor system according to the present invention. The ring cavity consists of a gain modulated device (GMD) 10 driven by a pulse generator 20 which can switch on the GMD 10 at different repetition rates (frequencies). The output of the GMD 10 is split by a coupler 12 where one of its output acts as the output port of the system, while the other output is fed to port 1 of a circulator 14 which directs the signal to an FBG sensor array ($G_{11}, \ldots, G_{1M}, \ldots, G_{ij}, \ldots, G_{N1}, \ldots, G_{NM}$) via port 2, where $1 \leq i \leq N$ and $1 \leq j \leq M$. N is the number of group of FBGs in the array, and each group has M FBGs with different wavelengths. Therefore, the total number of FBGs in the array is N×M. Each group of FBGs is separated by a delay line with length$\geq L_D$. The signal reflected by the FBGs return to the input port of the GMD 10 through port 3 of the circulator 14, hence forming a ring cavity 16, the circulator also ensures unidirectional operation of the ring cavity 16.

Figure 10:
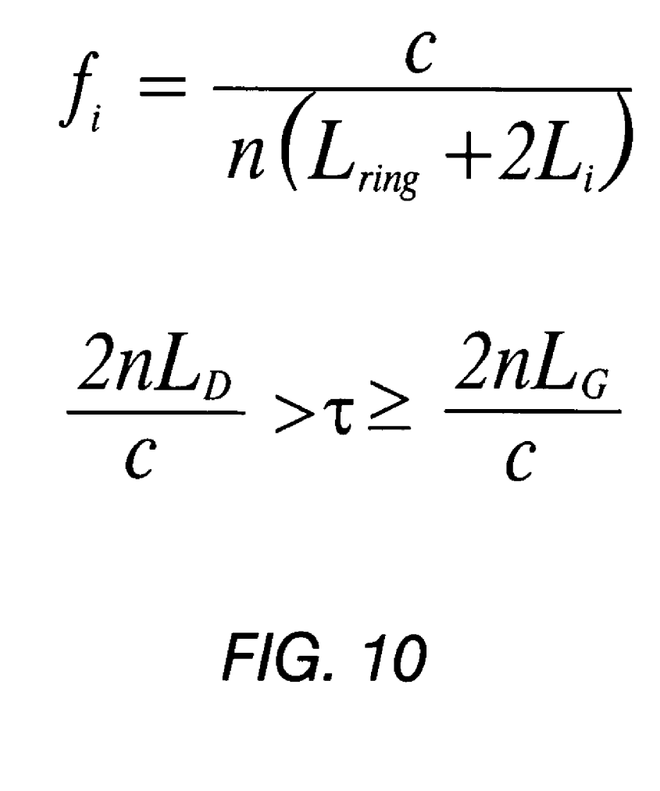
FIG. 10 provides the equations for calculating the driving frequency ($f_r$ and pulse-width ($\tau$) for using the sensor system of the present invention.

In this configuration, when the GMD 10 is activated by an electrical pulse from pulse generator 20, a broadband optical pulse is generated at the output of the GMD 10 and part of the power is sent to the FBG array. Each FBG reflects part of the incident pulse at different time back to the input of the GMD 10. Those reflected pulses arriving at the GMD 10 when it is switched on are amplified while other pulses are absorbed. When the GMD 10 is driven by a periodic pulse train of the pulse generator 20 having a period (the time between two pulses) equal to the cavity's round trip time formed by one group of the FBGs (having different wavelengths), the pulse reflected by this group of FBGs will be amplified each time it passes through the GMD 10. Hence, by passing through the GMD 10 a sufficient number of times, the signal generated by this group of FBGs at the output port of the coupler 12 can be of suitable strength for accurate measurements. Different group of FBGs in the array can be interrogated separately by changing the pulse frequency. The driving frequency ($f_i$) and pulse-width ($\tau$) of the signal to address the i-th group of FBGs in the array are calculated according to equation (1) and (2) shown in FIG. 10, respectively, where c is the speed of light, n is the refractive index of the fiber, $L_{ring}$ is the fiber length of the ring cavity, $L_i$ is the fiber length from port 2 of the circulator to the middle of a group of FBG and $L_G$ is the fiber length that spanned a group of FBGs.

Figure 2:
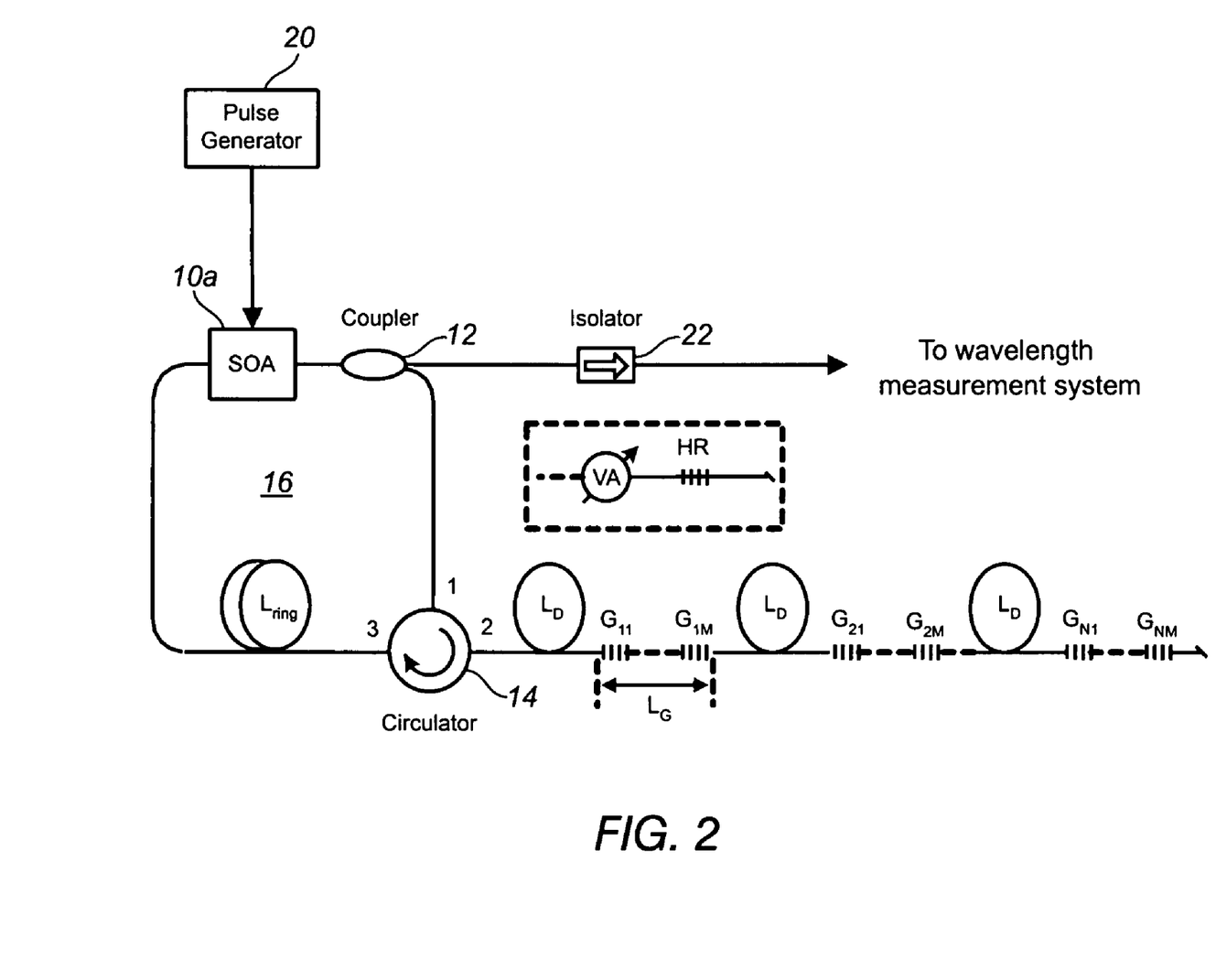
FIG. 2 shows a sensor system of FIG. 1 where a semiconductor amplifier is used as GMD.
Figure 3:
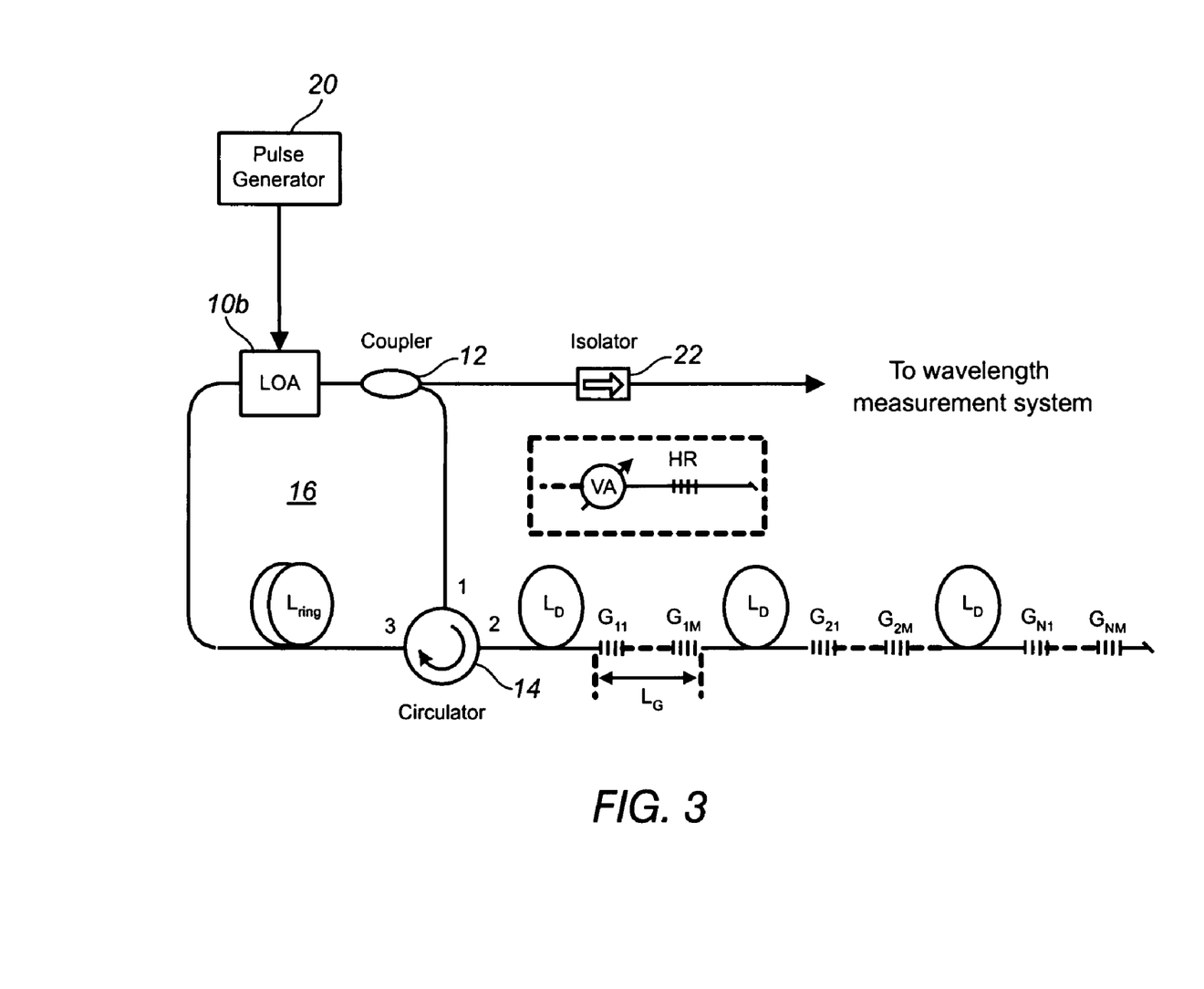
FIG. 3 shows a sensor system of FIG. 1 where a linear optical amplifier is used as GMD.
Figure 4:
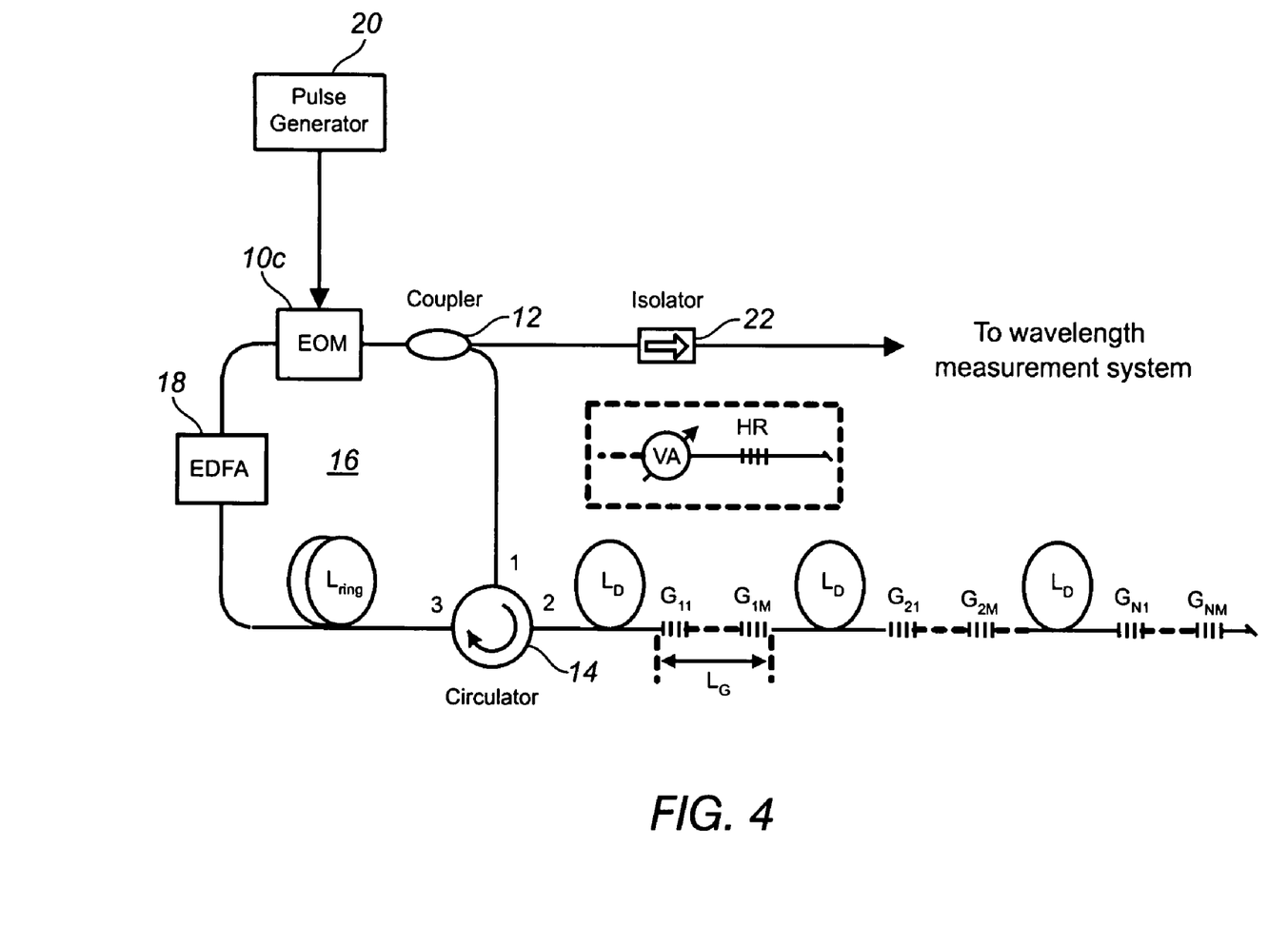
FIG. 4 shows a sensor system of FIG. 1 where an Erbium doped fiber amplifier coupled with an electro-optical modulator is used as GMD.
Figure 5:
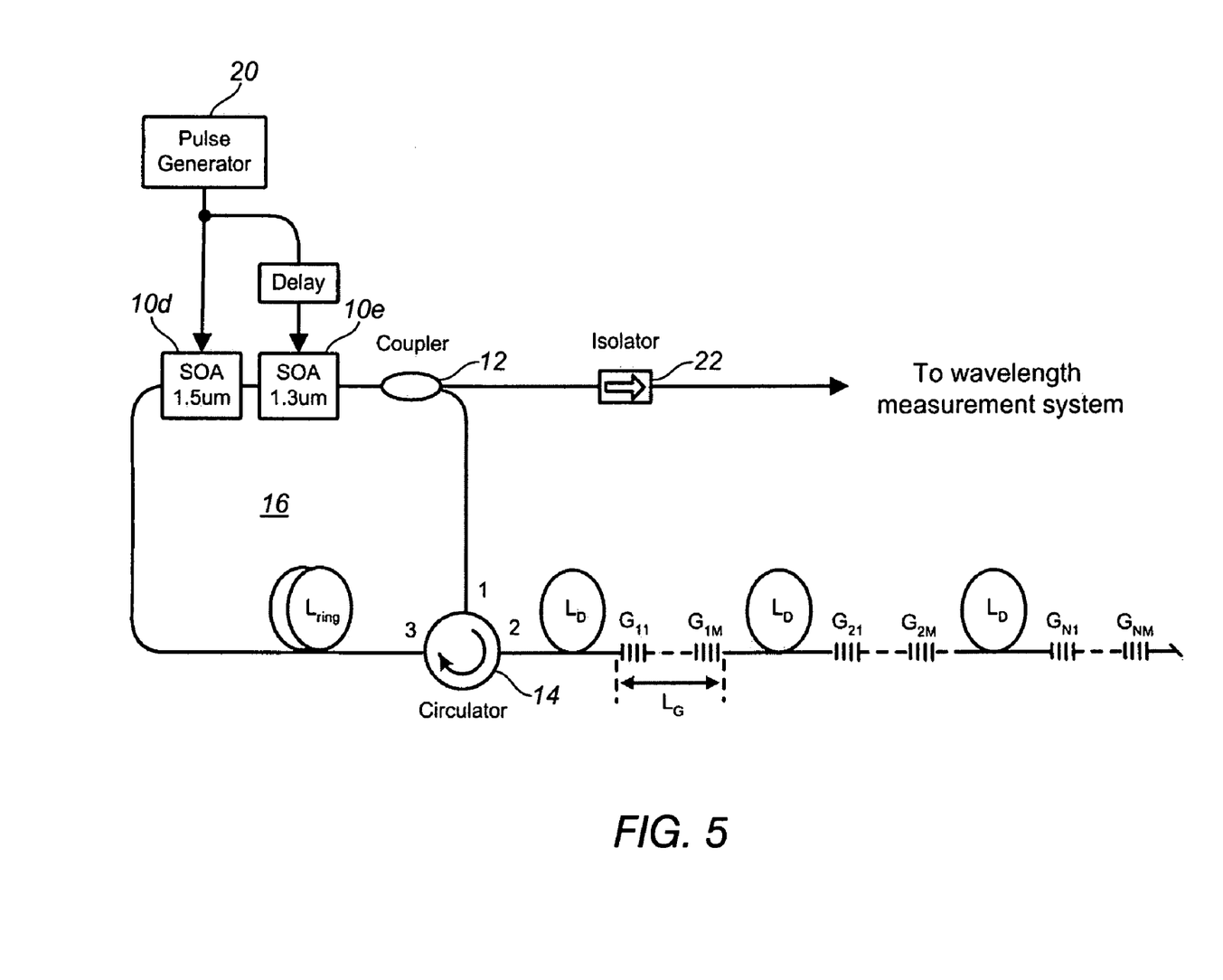
FIG. 5 shows a sensor system of FIG. 1 where two semiconductor amplifiers are used as GMD to widen the wavelength region of the system.

FIG. 2-FIG. 6 represent some examples of the sensor system according to the present invention. In FIG. 2, a semiconductor amplifier (SOA) 10a is employed as gain modulated device (GMD) 10. The SOA 10a is a small-size semiconductor device that amplifies an input optical signal when electric current is applied. The gain region (wavelength) of an SOA is dependent on the material used to fabricate the SOA. As shown in FIG. 3, a linear optical amplifier (LOA) 10b may be employed as the GMD 10 for practicing the present invention. The characteristic of an LOA is similar to that of an SOA except it provides a relative linear amplifier factor over a wide wavelength region. In FIG. 4, an Erbium doped fiber amplifier (EDFA) 18 coupled with an electro-optical modulator (EOM) 10c are used as the GMD 10. Unlike SOA 10a/LOA 10b, the EDFA 18 is an optical fiber based amplifier which cannot be directly modulated by electrical pulse, and EOM 10c is therefore required to close/open the ring cavity in this configuration. FIG. 5 illustrates that two SOAs 10d and 10e may be employed in the sensor system of the present invention. The two SOAs 10d and 10e operating at different wavelength regions can be cascaded to widen the operation (wavelength) region of the system. In fact, two or more GMDs 10 can be incorporated in this way to enhance the performance and capability of the system. FIG. 6 shows a different configuration where the coupler 12 is used for both signal output as well as feedback of the sensors signal to the ring cavity 16. An additional isolator 22 is deployed in FIG. 6 in order to ensure unidirectional propagation in the ring cavity 16. The combined function of the coupler 12 and the isolator 22 in the ring cavity 16 in FIG. 6 is similar or equivalent to that of the circulator 14 used in FIG. 1.

All the components used in the sensor systems of FIG. 1-FIG. 6 are readily available commercially, and their functions, capacities, features and other relevant attributes are generally appreciated by people with ordinary skill in the art and require no further descriptions herein. General requirements, functional equivalents and some commercial sources, although generally known to people in the field, are provided in the following for easy reference.

GMD 10: Any optical device or module that can provide optical gain as well as shutter functions may be used as GMD 10. Some examples are SOA 10a, LOA 10b, and EDFA 18 coupled with EOM 10c, shown in FIGS. 2, 3 and 4, respectively. SOA may be obtained from Samsung (www.samsung.com), Qphotonics (www.qphotonics.com/home.php?cat=29), or CIP (www.ciphotonics.com/cip_products_SOA.htm). LOA may be obtained from Finisar Corporation (www.finisar.com/optics/LinearOpticalAmplifier.php). EDFA may be obtained from JDSU (wwwjdsu.com) or Amonics Ltd. (www.amonics.com/edfa.htm). EOM may be obtained from JDSU (wwwjdsu.com).

Pulse Generator 20: any device which generates electrical pulses with adjustable parameters, namely pulse repetition rate, frequency, pulse width, rise time, fall time, and the high- and low-voltage levels of the pulses may be used as pulse generation for the purpose of practicing this invention. A pulse generator may be obtained from Standard Research System, Model DG535 (www.srsys.com/products/DG535).

Coupler 12: any passive optical devices that connect three or more ports, splitting optical power from one input end to two or more outputs, or combining two or more input ends into one output end may be used as coupler for the purpose of practicing this invention. A coupler may be obtained from JDSU.

Isolator 22: any passive optical devices that allow light to propagate through it in one direction only may be used as isolator for the purpose of practicing this invention. An Isolator may be obtained from JDSU (http://products.jdsu-.com/assets/public/pdf/10139957_005_101405_pfi_ss-ll_ds_cc_ae.pdf).

Circulator 14: any passive optical devices that connect three or more ports in such a way that allow optical signal propagation from one port to the next sequential port only (that is from port 1 to port 2 but not to other ports, from port 2 to port 3 but not to other ports, and so on). A Circulator may be obtained from JDSU (http://products.jdsu.com/assets/public/pdf/CIR_080805.pdf).

FBG sensor: any passive optical devices that have a periodically altered refractive index to reflect certain wavelengths while allowing others to pass can be used as FBG sensor for the purpose of practicing this invention. FBG sensors can be obtained from QPS Photronics (www.qpscom.com).

Particular Embodiments (a) Sensing Signal Strength Versus FBG Reflectivity

Figure 7:
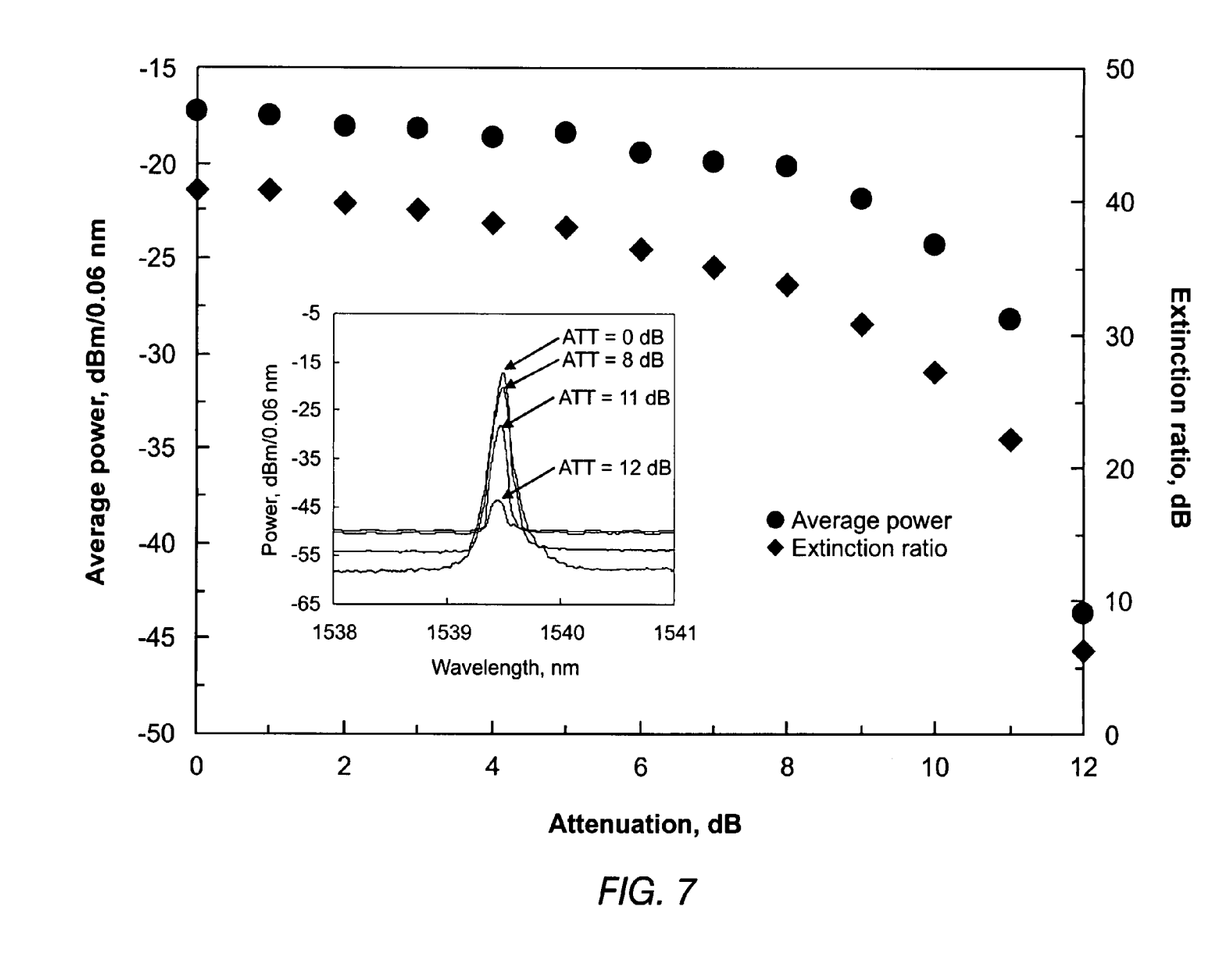
FIG. 7 shows power and extinction ratio of the output signal as a function of additional attention as measured for a sensor system of the present invention and wherein the inset shows the output spectra versus attenuation settings.

The sensitivity of the proposed ring cavity was evaluated with a variable attenuator followed by a ~95% reflection FBG to simulate FBGs with different reflectivity, as shown in the inset of FIG. 1. The SOA used in this experiment has a small signal gain of 25 dB and saturated output power of +7 dBm at a driving current of 150 mA. The center wavelength and optical bandwidth are 1540 nm and 40 nm, respectively. The SOA was biased at 30 mA and modulated with 120 mA by a current driver (Analog Devices. AD9662) with pulse rate and pulsewidth controlled by the pulse generator (Standard Research Systems DG535). The coupler fed back 80% of the power to the cavity, although other percentages may also provide satisfactory results. About 220 meters of single mode fiber was inserted in the cavity to allow for the 1-MHz maximum frequency of the pulse generator. The length, of course, should be adjusted according to particular situations. 15-ns pulses ($\tau$) were used to emulate a fiber delay line of >1.5 meters. The isolator was employed to prevent unwanted reflection to the cavity. The output signal is measured by an optical spectrum analyzer (OSA) with a resolution of 0.06 nm. FIG. 7 shows the optical power and extinction ratio of the output signal as the attenuation is increased. The average output power and extinction ratio of −17 dBm and 40 dB, respectively were measured when no attenuation was inserted between the circulator and the high reflection FBG. The peak power of the output pulse is thus over +3 dBm (insertion loss of the VOA=0.6 dB and the ON/OFF ratio ~1/70). Inset of FIG. 7 shows the output spectra at different attenuation settings. As the attenuation increases, the ASE (amplified spontaneous emission) power increases and the average power decreases. With 10 dB attenuation, which corresponds to a FBG with <1% reflection, the noise floor is raised by ~8 dB. However, high quality signal with average power of −24 dBm and extinction ratio of 27 dB can still be obtained. These results indicate that this configuration is capable of interrogating FBGs with low reflectivity and hence, a large number of FBGs can be multiplexed in a single strand of fiber.

(b) Single Wavelength TDM System

Figure 8:
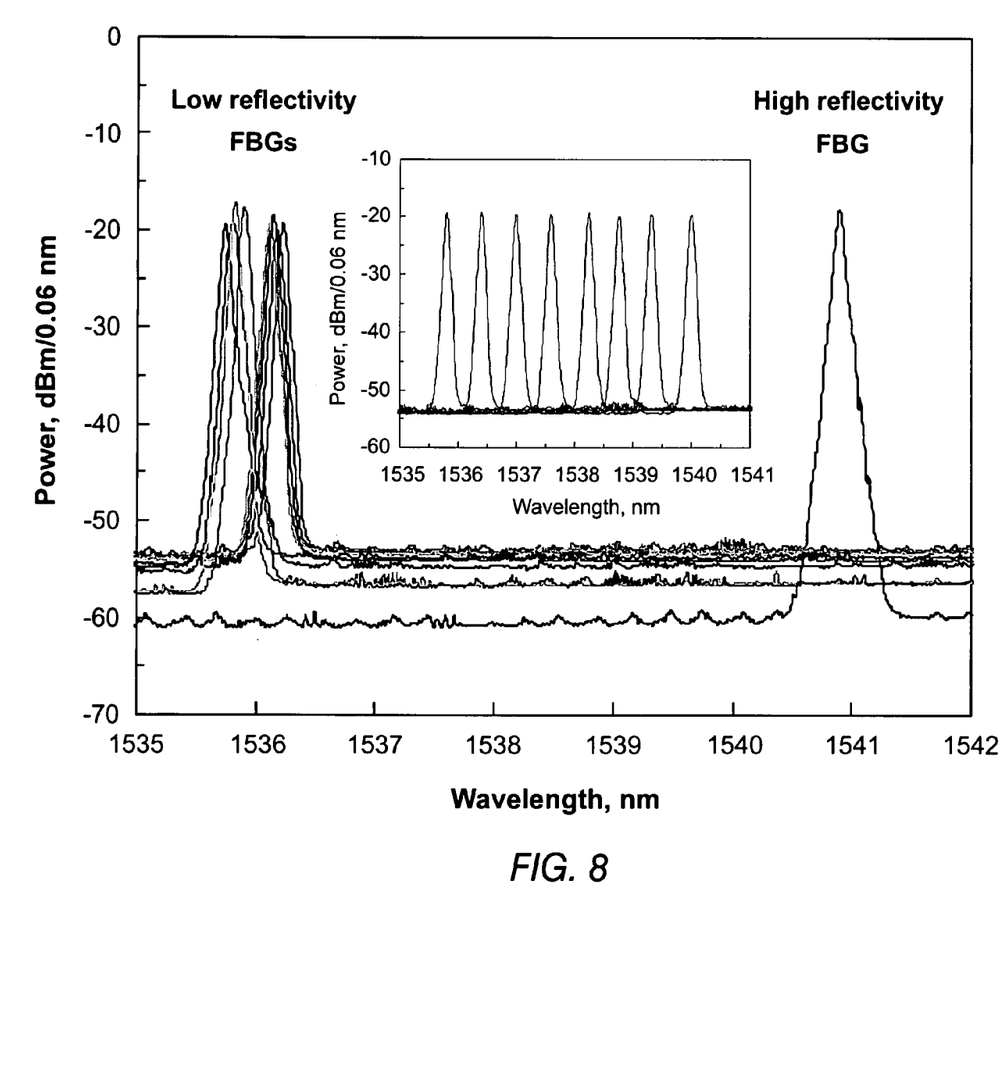
FIG. 8 represents output spectra of a number of FBG sensors measured at the output of the ring cavity each at a different driving frequency of the pulse generator and the inset shows the wavelength change of the eighth FBG as a function of applied strain.
Figure 9:
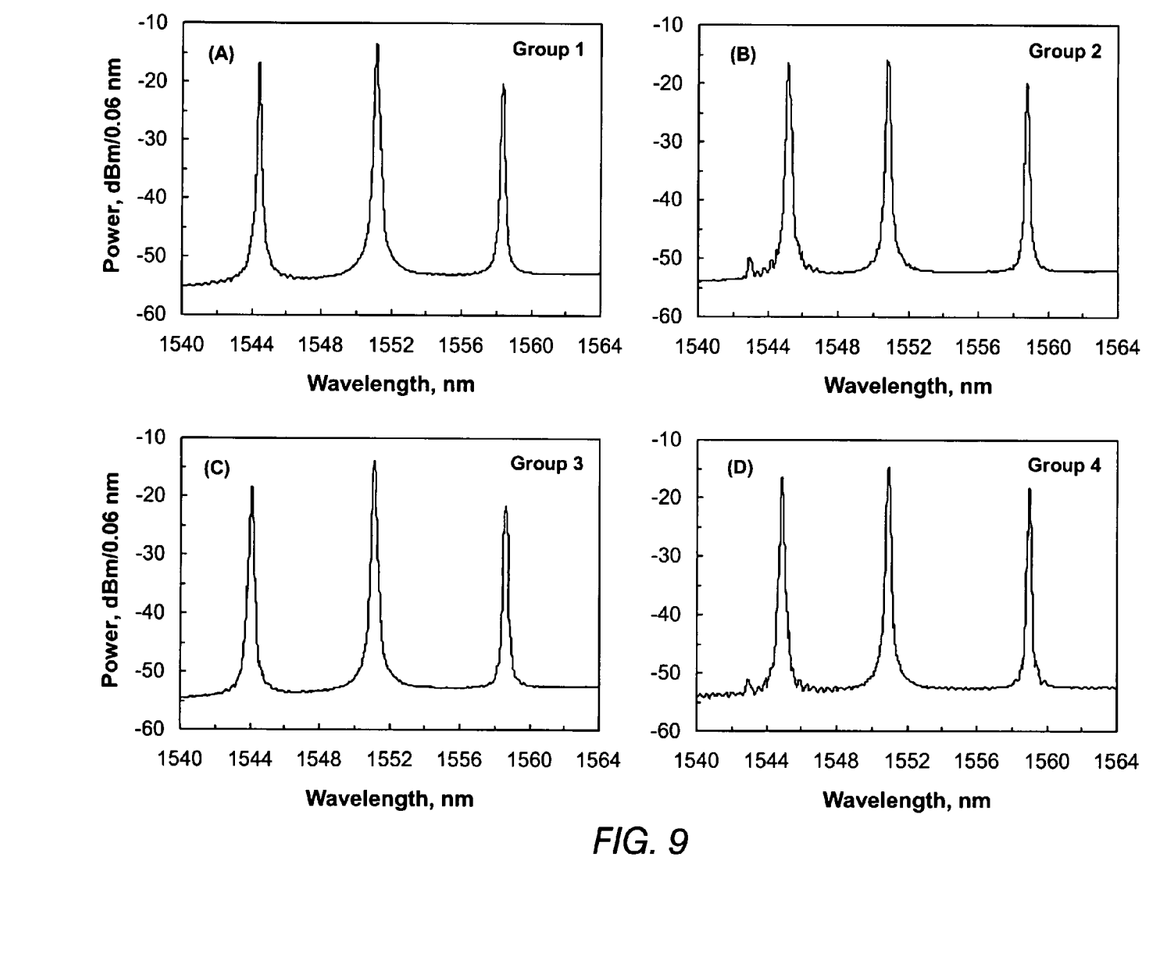
FIG. 9 shows the output spectra of four groups of three FBGs measured at the output of the ring cavity.

The system was then tested by connecting an array of nine FBGs having nearly identical Bragg wavelengths of 1535~1536 nm and reflectivity of 1~4%, and ~2 meter long fiber delay lines were used to separate each FBG. A high reflection (~90%) FBG with Bragg wavelength of 1540.5 nm was also connected at the end of the array to evaluate the crosstalk induced by the sensing signal when a strong reflection from different wavelength is introduced. The SOA was driven by the same current condition and pulsewidth as described in the preceding section. The output frequency of the pulse generator was tuned to address each FBG in the array sequentially and the output signal measured by the OSA FIG. 8 shows the captured spectra of different FBGs where the frequency of the pulse generator varied from 896.7 kHz to 804.2 kHz. The spectra produced by the low reflectivity FBGs show similar output characteristics and no crosstalk located at the wavelength of the high reflectivity FBG was observed. Variations of the output power and extinction ratio of these spectra are due to different reflectivity of the FBGs. The frequency was then fixed at 821.4 kHz that match the repetition rate of the eighth FBG while axial strain was applied to tune its wavelength. The inset in FIG. 8 shows the change of output spectra of the FBG as a function of applied strain, the peak wavelength change exhibits excellent linearity with a relationship of ~1.1 pm/με up to a level of 4000με, and no significant changes in the output power, extinction ratio and spectral shape were observed.

(c) Simultaneous Multi-Wavelength TDM and WDM System

For a simultaneous TDM and WDM operation, an FBG array comprising four groups of three FBGs which have reflectivity of ~4% and Bragg wavelength of 1544 nm, 1551 nm, and 1559 nm was constructed. The length of fibers separating each group and that separating the FBGs within a group were ~6 m and ~4 m respectively. 40-ns pulses were used to interrogate each group sequentially, FIG. 9 (*a*)-(*d*) show the measured spectra when the driving frequency of the pulse generator were 962.8 kHz, 920.1 kHz, 883.6 kHz and 847.4 kHz, respectively. The spectra from each group show similar output characteristic. Higher signal power at the second FBG (1551 nm) within each group was observed. This is probably because the pulses reflected from FBGs located near the center of the group experience a longer period of amplification each time it passes through the SOA. A small spectral peak due to wave-mixing effects in the SOA appeared occasionally. However, its amplitude is very small (<40 dB compare to the sensor signals) and can be completely eliminated during the wavelength measurement process.

The above embodiments of a TDM+WDM FBG sensor system according to the present invention, using a pulsed GMD connected in a ring cavity configuration, show that the system with low component count and low loss improves the power and extinction ratio of the sensing signals significantly. Satisfactory results were obtained from both TDM and TDM+WDM operations. The system therefore is particularly useful for sensor applications where large numbers of FBG are needed.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A method of interrogating a plurality of sensor units each containing one or more FBG sensors, comprising:
   (a) switching on and off a gain modulated device at a repetition rate predetermined for a sensor unit under interrogation out of said plurality of sensor units, said gain modulated device receiving an input at an input end and producing an output at an output end, said input end and output end being separate ends;
   (b) splitting said output from said output end of said gain modulated device into at least a first portion and a second portion;
   (c) sending said first portion to said plurality of sensor units each of which generates a reflection;
   (d) feeding said reflection by each of said sensor units as an input to said input end of said modulated device which is configured to be switched on when said reflection by said sensor unit under interrogation arrives and switched off when said reflection by another of said sensor units arrives;
   (e) repeating steps (b)-(d) for a number of times until said output from said gain modulated device in step (a) is sufficient for wavelength measurement;
   (f) changing said repetition rate of step (a) to a predetermined rate for interrogating another of said plurality of sensor units.

2. The method of claim 1, wherein in step (b) said output from said output end of said gain modulated device is split by an optical coupler.

3. The method of claim 2, wherein in step (c) said first portion is sent to said plurality of sensor units via an optical circulator which has at least three ports, connected to said optical coupler, said plurality of sensor units and said input end of said gain modulated device, respectively.

4. The method of claim 3, wherein in step (d) said reflection by each of said sensor units is fed to said input end of said modulated device via said optical circulator.

5. The method of claim 2, wherein in step (c) said first portion is sent to said plurality of sensor units via said optical coupler which has at least four ports, wherein said at least four ports are connected to said output end of said gain modulated device, said wavelength measuring system, said plurality of sensor units and said input end of said gain modulated device, respectively.

6. The method of claim 5, wherein in step (d) said reflection by each of said sensor units is fed to said input end of said gain modulated device via said optical coupler.

7. The method of claim 5, wherein each of said plurality of sensor units has at least two FBG sensors, each with a different resonant wavelength and being interrogated by wave length-division-multiplexing.

* * * * *